United States Patent [19]

Fogarty, Jr. et al.

[11] Patent Number: 4,468,322
[45] Date of Patent: Aug. 28, 1984

[54] SLIDE PLATE SCREEN CHANGER

[75] Inventors: John E. Fogarty, Jr., Westboro; Robert W. Anderson, Jr., Uxbridge, both of Mass.

[73] Assignee: Thermoplas Machinery, Inc., Westboro, Mass.

[21] Appl. No.: 458,327

[22] Filed: Jan. 17, 1983

[51] Int. Cl.³ .............................................. B01D 29/02
[52] U.S. Cl. .................................... 210/236; 210/329; 210/445; 210/447
[58] Field of Search ........... 210/445, 447, 332, 333.01, 210/333.1, 334, 106, 329, 330, 359, 331, 791, 797, 798, 232, 236; 285/356, 357, 392, 393

[56] References Cited

U.S. PATENT DOCUMENTS

| | | | |
|---|---|---|---|
| 1,452,268 | 4/1923 | Erickson | 285/393 |
| 2,463,707 | 3/1949 | Matovsek | 285/393 |
| 3,962,092 | 6/1976 | Newman | 210/329 |
| 4,059,525 | 11/1977 | Krasnou | 210/329 |

Primary Examiner—Richard V. Fisher
Assistant Examiner—John Donofrio
Attorney, Agent, or Firm—Thompson, Birch

[57] ABSTRACT

A slide plate screen changer has a housing defining a material flow passage and a transverse slide plate passage in which is mounted a movable screen plate. Seal rings on the upstream and downstream sides respectively of the screen plate prevent leakage of material from the flow passage. One of the seals is adjusted by means of a threaded bushing which surrounds the flow passage and which protrudes axially from one end of the housing where it is fully accessible to torque exerting tools.

8 Claims, 4 Drawing Figures

U.S. Patent
Aug. 28, 1984
4,468,322
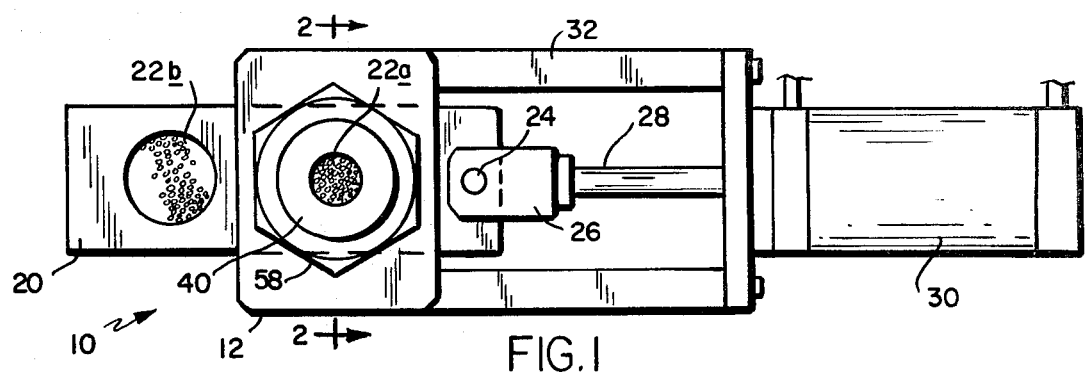
FIG. 1
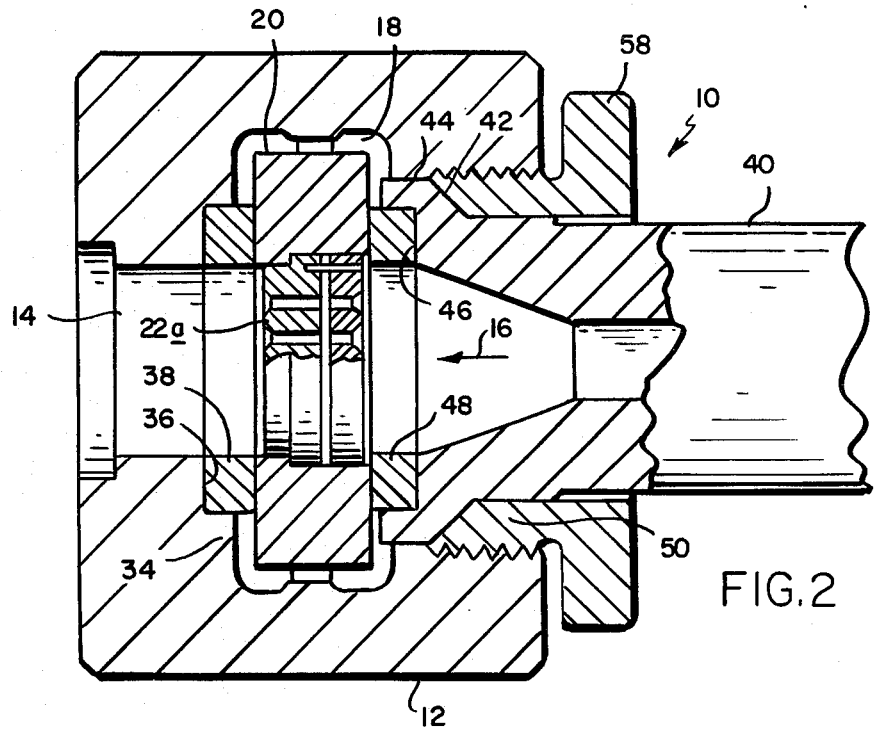
FIG. 2
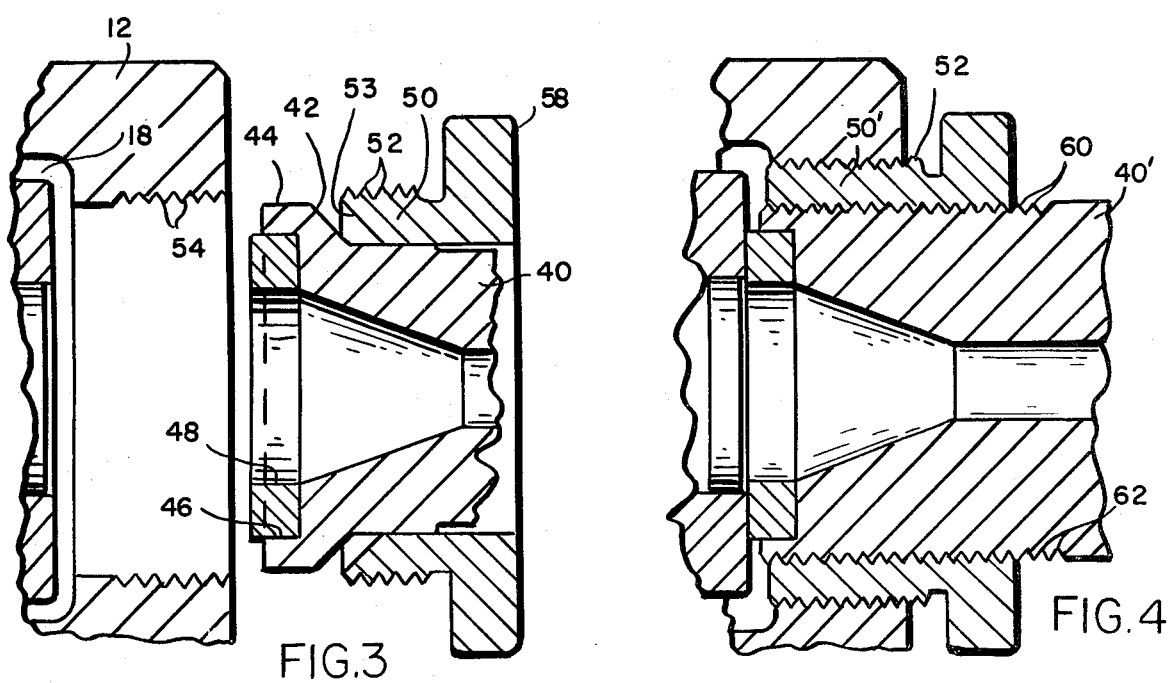
FIG. 3
FIG. 4

SLIDE PLATE SCREEN CHANGER

BACKGROUND OF THE INVENTION

1. Field of the Invention

This invention relates generally to slide plate screen changers of the type used in removing impurities from flowable materials such as for example extruded polymers. The invention is concerned in particular with an improved arrangement for adjusting the seals between which the slide plates are confined or sandwiched to prevent leakage of the material being filtered.

2. Description of the Prior Art

Conventional slide plate screen changers include a housing defining a flow passage for the material to be filtered, with a slide plate carrying a plurality of filter screens, the slide plate being movable transversally across the flow passage to expose selected ones of the filter screens to the material being filtered. Seal rings surround the flow passage on the upstream and downstream sides respectively of the slide plate to prevent escape of the material being filtered. The downstream seal ring is usually stationary, with the upstream seal ring being adjustable towards the downstream seal ring to tightly confine the slide plate therebetween. In one known arrangement, this adjustment is accomplished by directly engaging the upstream seal ring with an adjusting nut which surrounds the flow passage and which is threaded into the housing at a location at least partially confined within the housing intermediate its upstream and downstream ends. One problem with this type of arrangement is that polymers have a tendency to seep past the upstream seal ring into the threads of the adjusting nut, often filling clearances between the nut and the housing. This polymer then degrades, jamming the threads and making it extremely difficult to back the nut off when replacing worn seals. Also, by confining the adjusting nut within the housing between its upstream and downstream ends, access to the nut is limited, and the overall size of the housing is increased unnecessarily.

Attempts have been made at overcoming the above problems by replacing the confined adjusting nut with an external flanged ring attached to the upstream side of the housing by a plurality of adjusting bolts. The problem with this arrangement, however, is that it is difficult if not impossible to uniformly tighten the individual adjusting bolts in order to obtain optimum seating of the upstream seal ring against the slide plate. Also, individual adjustment of the bolts is tedious, and unnecessarily time consuming.

SUMMARY OF THE PRESENT INVENTION

The present invention avoids the above-described problems by positioning the upstream seal ring between the upstream side of the slide plate and the end of an inlet sleeve axially received in the flow passage, and by adjusting the position of the upstream seal by means of a bushing which surrounds and engages the inlet sleeve, and which is threaded into the flow passage with a portion thereof protruding from the upstream side of the housing. The threaded bushing is substantially isolated from the upstream seal ring by the inlet sleeve interposed therebetween, and is thus safeguarded against jamming by polymer seepage. Moreover, the protruding portion of the bushing is fully accessible to operating personnel. The size and configuration of this protruding portion can be selected to optimize torque transmittal, without affecting the overall size of the screen changer housing.

These and other objects and advantages of the present invention will be further described with the aid of the accompanying drawings, wherein:

BRIEF DESCRIPTION OF THE DRAWINGS

FIG. 1 is a rear view of a slide plate screen changer in accordance with the present invention;

FIG. 2 is a longitudinal sectional view on an enlarged scale taken along line 2—2 of FIG. 1;

FIG. 3 is a partial sectional view similar to FIG. 2 showing the inlet sleeve and threaded bushing removed from the housing; and FIG. 4 is a partial sectional view similar to FIG. 3 showing an alternate embodiment of the invention.

DESCRIPTION OF PREFERRED EMBODIMENTS

Referring initially to FIGS. 1-3, a slide plate screen changer in accordance with a preferred embodiment of the present invention is shown at 10. The screen changer includes a housing 12 defining a through passage 14 for accommodating a flow of the material to be filtered in a direction depicted schematically in FIG. 2 by the arrow 16. The housing 12 further defines a through slide plate passage 18 communicating with and extending across the flow passage 14.

An elongated slide plate 20 extends through the slide plate passage and across the flow passage 14. The slide plate is adapted to carry a plurality of filter screen assemblies 22a, 22b. The slide plate is connected as at 24 by means of a clevis 26 or other like connection to the piston rod of a double-acting ram 30, the latter in turn being supported at a fixed location on one side of the housing 12 by means of a bracket 32. The ram 30 is operable in a conventional manner to shift the slide plate longitudinally so as to position selected ones of the filter screen assemblies 22a, 22b in the flow passage 14. For example, in the condition shown in FIGS. 1 and 2, the screen assembly 22a is operatively positioned across the flow passage 14, and the filter screen assembly 22b is located externally of the housing, where it may be cleaned or replaced while the filtering operation is in progress.

The housing defines an internal stationary abutment 34 located adjacent to the slide plate passage 18 on the downstream side of the slide plate 20. The abutment 34 is relieved as at 36 to define a circular groove in which is seated a first seal ring 38 surrounding the flow passage 14.

An inlet sleeve 40 is axially received in the flow passage 14 on the upstream side of the slide plate 20. The inlet sleeve is provided with an externally tapered portion 42 terminating in an enlarged diameter end, the latter being relieved as at 46 to define another circular groove in which is seated a second seal ring 48. The second seal ring also surrounds the flow passage 14 on the upstream side of the slide plate 20.

A bushing 50 surrounds the inlet sleeve 40. The bushing 50 has external threads 52 which coact in threaded engagement with internal threads 54 at the upstream end of the housing flow passage 14. One end of the bushing 50 is provided with an internally tapered portion 53, and the opposite end of the bushing is provided with an enlarged diameter hexagonal shoulder 58.

When the inlet sleeve 40 and bushing 50 are operatively arranged as shown in FIGS. 1 and 2, the bushing is threaded into the upstream end of the flow passage, with its hexagonal shoulder 58 protruding from the upstream side of the housing. A spanner wrench or other similar tool may be applied to the shoulder 58 to tighten the bushing 50, thus bringing its internally tapered portion 53 into contact with the externally tapered portion 42 on the inlet sleeve 40. This moves the inlet sleeve and the second seal ring 48 axially towards the first seal ring 38 to tightly confine the slide plate 20 therebetween. The bushing 50 is thus offset axially in the upstream direction from the second seal ring 40, with the externally tapered portion 42 of the inlet sleeve 40 being interposed therebetween.

Several important advantages stem from this arrangement. Firstly, the cooperatively engaged threads 52, 54 of the bushing and housing are substantially isolated from the interface between the second seal ring 48 and the slide plate 20 by the externally tapered portion 42 of the inlet sleeve. Thus, jamming of the threads by degraded or solidified material is substantially obviated. Secondly, the externally protruding shoulder 58 on the bushing is fully accessible to maintenance personnel, making it much easier to apply the high level of torque required to tightly confine the slide plate 20 between the seal rings 38, 48. Thirdly, because the enlarged diameter shoulder 58 is totally outside of the housing 12, it does not necessitate a corresponding and unnecessary enlargement of the housing. When the bushing 50 is completely unscrewed, as shown in FIG. 3, it can be axially removed from the housing along with the inlet sleeve 40 and the second seal ring 48.

FIG. 4 illustrates an alternate embodiment of the invention where the inlet sleeve 40' is externally threaded as at 60 for threaded engagement with internal threads 62 in the bore of the bushing 50'. The bushing 50' is again provided with external threads 52 engageable with internal threads 54 in the upstream end of the housing flow passage. The mating threads 60, 62 and 52, 54 have different pitches which produce a greater axial movement of the sleeve 40' relative to the bushing 50' as compared with that of the bushing 50' relative to the housing 12. In all other respects, the embodiment of FIG. 4 operates in a manner substantially identical to that of FIGS. 1-3.

In light of the foregoing, those skilled in the art will appreciate that changes and modifications can be made to the disclosed embodiments without departing from the spirit and scope of the invention. For example, it would be possible, although less preferable to do so, to arrange the sleeve 40 and bushing 50 on the downstream side of the slide plate 20. In this case, the upstream seal 48 would be stationary and the downstream seal 38 would be adjustable.

We claim:

1. A slide plate screen changer comprising:
 a housing defining a flow passage for the material to be filtered, said housing having a slide plate passage communicating with and extending transversally across said flow passage;
 a slide plate adapted to carry a plurality of filter screens, said slide plate being movable along said slide plate passage to position a selected one of said filter screens in said flow passage;
 stationary abutment means adjacent to said slide plate passage on one side of said slide plate;
 a sleeve axially received in said flow passage on the other side of said slide plate;
 a first seal ring surrounding said flow passage and supported by said abutment means on the said one side of said slide plate;
 a second seal ring surrounding said flow passage, said second seal ring being located on the other side of said slide plate and being carried in a circular groove in the end of said sleeve; and,
 a bushing surrounding said sleeve, said bushing being threaded into said flow passage and being engageable with said sleeve to axially displace said sleeve and said second seal ring towards said first seal ring to tightly confine said slide plate between said seal rings.

2. The slide plate screen changer of claim 1 wherein said stationary abutment means and said first seal ring are located on the downstream side of said slide plate, and wherein said sleeve is an inlet sleeve located on the upstream side of said slide plate along with said second seal ring and said bushing.

3. The slide plate screen changer of claim 2 wherein said bushing protrudes axially from the upstream side of said housing.

4. The slide plate screen changer of claim 2 wherein said inlet sleeve is provided with an externally flared portion terminating at an enlarged diameter end on the upstream side of said slide plate, said circular groove being located in said enlarged diameter end, and said bushing being engageable with said externally flared portion.

5. The slide plate screen changer of claim 2 wherein said bushing is in threaded engagement with said inlet sleeve.

6. The slide plate screen chamber of claims 2 or 3 wherein said inlet sleeve is interposed between said bushing and said second seal ring.

7. The slide plate screen changer of claim 6 wherein said bushing is offset axially in the upstream direction from said second seal ring.

8. A slide plate screen changer comprising:
 a housing having a flow passage extending therethrough for the material to be filtered;
 means associated with said housing for accommodating the positioning of a slide plate transversally across said flow passage, said slide plate being adapted to carry a plurality of filter screens and being movable to position selected ones of said filter screens in said flow passage;
 first and second seal rings surrounding said flow passage, said first seal ring being supported at a stationary location on the downstream side of said slide plate, and said second seal ring being located on the upstream side of said slide plate and being carried in a circular groove in the end of an inlet sleeve axially received in said flow passage; and
 a bushing surrounding said inlet sleeve and threaded into said flow passage at a location offset axially from said second seal ring, said bushing being engageable with and operative through said inlet sleeve to axially displace said second seal ring towards said first seal ring to thereby tightly confine said slide plate therebetween.

* * * * *